(12) United States Patent
Park et al.

(10) Patent No.: US 8,493,854 B2
(45) Date of Patent: Jul. 23, 2013

(54) METHOD FOR AVOIDING COLLISION USING IDENTIFIER IN MOBILE NETWORK

(75) Inventors: Sung Jun Park, Anyang-si (KR); Young Dae Lee, Anyang-si (KR); Sung Duck Chun, Anyang-si (KR); Myung Cheul Jung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/159,574

(22) PCT Filed: Feb. 7, 2007

(86) PCT No.: PCT/KR2007/000667
§ 371 (c)(1),
(2), (4) Date: Jun. 27, 2008

(87) PCT Pub. No.: WO2007/091841
PCT Pub. Date: Aug. 16, 2007

(65) Prior Publication Data
US 2008/0304410 A1    Dec. 11, 2008

Related U.S. Application Data

(60) Provisional application No. 60/771,305, filed on Feb. 7, 2006.

(30) Foreign Application Priority Data

Sep. 11, 2006    (KR) .................. 10-2006-0087372

(51) Int. Cl.
*G01R 31/08* (2006.01)
*H04W 4/00* (2009.01)
*H04J 3/06* (2006.01)
*H04L 12/413* (2006.01)

(52) U.S. Cl.
USPC ............ 370/231; 370/329; 370/350; 370/445

(58) Field of Classification Search
USPC ......... 370/229–231, 278, 312, 318, 329–330, 370/331, 335–338, 347, 343, 350, 443, 342, 370/461, 473, 442, 462, 447, 348
See application file for complete search history.

(56) References Cited

U.S. PATENT DOCUMENTS

| | | | |
|---|---|---|---|
| 5,659,756 A | 8/1997 | Hefferon et al. | |
| 5,828,677 A | 10/1998 | Sayeed et al. | |

(Continued)

FOREIGN PATENT DOCUMENTS

| | | |
|---|---|---|
| AU | 2007-212916 | 8/2007 |
| CN | 1267146 | 9/2000 |

(Continued)

OTHER PUBLICATIONS

Huawei: "Further Considerations on Multiplexing Method of Shared Control Channel in Uplink Single-Carrier FDMA", 3GPP TSG-RAN WG1, R1-051430 [online], Nov. 7, 2005 [retrieved on Jul. 24, 2008]. Retrieved from the Internet: <http://www.3gpp.org/ftp/TSG_RAN/WG1_RL1/TSGR1_43/Docs/R1-051430.zip> pp. 1-6.

(Continued)

*Primary Examiner* — Kevin C Harper
*Assistant Examiner* — Samina Choudhry
(74) *Attorney, Agent, or Firm* — Lee, Hong, Degerman, Kang & Waimey

(57) ABSTRACT

A method for avoiding collision among transmissions from user equipment in a mobile network is provided. The method includes transmitting a preamble to a base station via a random access channel (RACH) and transmitting a response signal including an identifier of the user equipment to the user equipment in response to the RACH. It is possible to transmit/receive reliable data while reducing collision among transmissions from user equipment by efficiently using the identifier of the user equipment when the user equipment uses the RACH.

8 Claims, 4 Drawing Sheets

U.S. PATENT DOCUMENTS

| | | |
|---|---|---|
| 6,088,342 A | 7/2000 | Cheng et al. |
| 6,138,158 A | 10/2000 | Boyle et al. |
| 6,317,430 B1 | 11/2001 | Knisely et al. |
| 6,330,448 B1 | 12/2001 | Otsuka et al. |
| 6,381,229 B1 | 4/2002 | Narvinger et al. |
| 6,480,525 B1 | 11/2002 | Parsa et al. |
| 6,571,102 B1 | 5/2003 | Hogberg et al. |
| 6,597,668 B1 | 7/2003 | Schafer et al. |
| 6,597,675 B1 | 7/2003 | Esmailzadeh et al. |
| 6,643,275 B1 | 11/2003 | Gustafsson et al. |
| 6,694,148 B1 | 2/2004 | Frodigh et al. |
| 6,728,225 B1 | 4/2004 | Ozluturk |
| 6,785,510 B2 | 8/2004 | Larsen |
| 6,791,963 B1 | 9/2004 | Hwang et al. |
| 6,795,412 B1 | 9/2004 | Lee |
| 6,850,504 B1 | 2/2005 | Cao et al. |
| 6,859,445 B1 * | 2/2005 | Moon et al. .................. 370/335 |
| 6,882,727 B1 | 4/2005 | Vialen et al. |
| 6,907,005 B1 | 6/2005 | Dahlman et al. |
| 6,907,015 B1 | 6/2005 | Moulsley et al. |
| 6,947,394 B1 | 9/2005 | Johansson et al. |
| 6,950,420 B2 | 9/2005 | Sarkkinen et al. |
| 6,965,580 B1 * | 11/2005 | Takagi et al. .................. 370/312 |
| 7,016,343 B1 | 3/2006 | Mermel et al. |
| 7,031,708 B2 | 4/2006 | Sarkkinen et al. |
| 7,075,971 B2 | 7/2006 | Parsa et al. |
| 7,099,309 B2 | 8/2006 | Davidson |
| RE39,454 E | 1/2007 | Cantoni et al. |
| 7,359,345 B2 | 4/2008 | Chang et al. |
| 7,376,424 B2 | 5/2008 | Kim et al. |
| 7,385,952 B2 | 6/2008 | Mantha et al. |
| 7,398,108 B2 | 7/2008 | Hondo |
| 7,430,206 B2 | 9/2008 | Terry et al. |
| 7,436,801 B1 | 10/2008 | Kanterakis |
| 7,496,113 B2 | 2/2009 | Cai et al. |
| 7,535,886 B2 | 5/2009 | Lee et al. |
| 7,664,059 B2 | 2/2010 | Jiang |
| 7,839,829 B2 | 11/2010 | Lee et al. |
| 7,848,308 B2 | 12/2010 | Lee et al. |
| 7,881,724 B2 | 2/2011 | Park et al. |
| 8,090,382 B2 | 1/2012 | Park et al. |
| 2001/0024956 A1 | 9/2001 | You et al. |
| 2002/0009129 A1 | 1/2002 | Choi et al. |
| 2002/0021698 A1 | 2/2002 | Lee et al. |
| 2002/0021714 A1 | 2/2002 | Seguin |
| 2002/0032884 A1 | 3/2002 | Kobata et al. |
| 2002/0044527 A1 | 4/2002 | Jiang et al. |
| 2002/0071480 A1 | 6/2002 | Marjelund et al. |
| 2002/0090004 A1 | 7/2002 | Rinchiuso |
| 2002/0093940 A1 | 7/2002 | Toskala et al. |
| 2002/0126629 A1 | 9/2002 | Jiang et al. |
| 2002/0131375 A1 | 9/2002 | Vogel et al. |
| 2002/0160744 A1 | 10/2002 | Choi et al. |
| 2002/0181436 A1 | 12/2002 | Mueckenheim et al. |
| 2002/0187789 A1 | 12/2002 | Diachina et al. |
| 2002/0191559 A1 | 12/2002 | Chen et al. |
| 2003/0003920 A1 | 1/2003 | Sebastian |
| 2003/0007510 A1 * | 1/2003 | Yeo et al. .................. 370/469 |
| 2003/0016672 A1 | 1/2003 | Rosen et al. |
| 2003/0043741 A1 | 3/2003 | Mukai et al. |
| 2003/0054829 A1 | 3/2003 | Moisio |
| 2003/0076812 A1 | 4/2003 | Benedittis |
| 2003/0084185 A1 | 5/2003 | Pinkerton |
| 2003/0103476 A1 | 6/2003 | Choi et al. |
| 2003/0131124 A1 | 7/2003 | Yi et al. |
| 2003/0137931 A1 | 7/2003 | Hans et al. |
| 2003/0139170 A1 | 7/2003 | Heo |
| 2003/0147371 A1 | 8/2003 | Choi et al. |
| 2003/0149371 A1 | 8/2003 | Shiga et al. |
| 2003/0210669 A1 | 11/2003 | Vayanos et al. |
| 2003/0223393 A1 | 12/2003 | Lee et al. |
| 2003/0223452 A1 | 12/2003 | Toskala et al. |
| 2003/0236085 A1 | 12/2003 | Ho |
| 2004/0001452 A1 | 1/2004 | Day et al. |
| 2004/0002334 A1 | 1/2004 | Lee et al. |
| 2004/0006643 A1 | 1/2004 | Dolson et al. |
| 2004/0008658 A1 | 1/2004 | Dahlman et al. |
| 2004/0008659 A1 | 1/2004 | Kim |
| 2004/0014452 A1 | 1/2004 | Lim et al. |
| 2004/0028078 A1 | 2/2004 | Beckmann et al. |
| 2004/0057387 A1 | 3/2004 | Yi et al. |
| 2004/0077357 A1 | 4/2004 | Nakada |
| 2004/0097192 A1 | 5/2004 | Schiff |
| 2004/0103435 A1 | 5/2004 | Yi et al. |
| 2004/0114593 A1 | 6/2004 | Dick et al. |
| 2004/0114606 A1 | 6/2004 | Haddad |
| 2004/0116143 A1 | 6/2004 | Love et al. |
| 2004/0117860 A1 | 6/2004 | Yi et al. |
| 2004/0125772 A9 | 7/2004 | Wu et al. |
| 2004/0127223 A1 | 7/2004 | Li et al. |
| 2004/0147266 A1 | 7/2004 | Hwang et al. |
| 2004/0157602 A1 | 8/2004 | Khawand |
| 2004/0171395 A1 | 9/2004 | Shin |
| 2004/0184437 A1 | 9/2004 | Lee et al. |
| 2004/0185860 A1 | 9/2004 | Marjelund et al. |
| 2004/0196861 A1 | 10/2004 | Rinchiuso et al. |
| 2004/0198369 A1 | 10/2004 | Kwak et al. |
| 2004/0202140 A1 | 10/2004 | Kim et al. |
| 2004/0208160 A1 | 10/2004 | Petrovic et al. |
| 2004/0229626 A1 | 11/2004 | Yi et al. |
| 2004/0248600 A1 | 12/2004 | Kim |
| 2004/0264497 A1 | 12/2004 | Wang et al. |
| 2004/0264550 A1 | 12/2004 | Dabak |
| 2005/0008035 A1 | 1/2005 | Eklund et al. |
| 2005/0013272 A1 | 1/2005 | Hwang et al. |
| 2005/0014508 A1 | 1/2005 | Moulsley et al. |
| 2005/0020260 A1 | 1/2005 | Jeong et al. |
| 2005/0025039 A1 | 2/2005 | Hwang et al. |
| 2005/0026623 A1 | 2/2005 | Fisher |
| 2005/0041573 A1 | 2/2005 | Eom et al. |
| 2005/0054368 A1 | 3/2005 | Amerga |
| 2005/0059421 A1 | 3/2005 | Reed et al. |
| 2005/0063336 A1 | 3/2005 | Kim et al. |
| 2005/0073987 A1 | 4/2005 | Wu |
| 2005/0105482 A1 | 5/2005 | Kobayashi et al. |
| 2005/0107036 A1 | 5/2005 | Song et al. |
| 2005/0114489 A1 | 5/2005 | Yonge, III et al. |
| 2005/0118947 A1 | 6/2005 | Ames et al. |
| 2005/0135416 A1 | 6/2005 | Ketchum et al. |
| 2005/0157678 A1 | 7/2005 | Mantha et al. |
| 2005/0157696 A1 | 7/2005 | Yamamoto |
| 2005/0185608 A1 | 8/2005 | Lee et al. |
| 2005/0190728 A1 | 9/2005 | Han et al. |
| 2005/0197134 A1 | 9/2005 | McKenna et al. |
| 2005/0213605 A1 | 9/2005 | Kim et al. |
| 2005/0243767 A1 | 11/2005 | Zhang et al. |
| 2005/0249141 A1 | 11/2005 | Lee et al. |
| 2005/0249222 A1 | 11/2005 | van Kampen et al. |
| 2005/0250500 A1 | 11/2005 | Xu |
| 2005/0260997 A1 | 11/2005 | Korale et al. |
| 2005/0265301 A1 | 12/2005 | Heo et al. |
| 2005/0271025 A1 | 12/2005 | Guethaus et al. |
| 2005/0281212 A1 | 12/2005 | Jeong et al. |
| 2005/0288026 A1 | 12/2005 | Byun et al. |
| 2006/0002367 A1 | 1/2006 | Lee et al. |
| 2006/0007886 A1 | 1/2006 | Lee et al. |
| 2006/0018289 A1 | 1/2006 | Schulist et al. |
| 2006/0025079 A1 | 2/2006 | Sutskover et al. |
| 2006/0045047 A1 | 3/2006 | Choi et al. |
| 2006/0059186 A1 | 3/2006 | Backlund |
| 2006/0062196 A1 | 3/2006 | Cai et al. |
| 2006/0072494 A1 | 4/2006 | Matusz |
| 2006/0143300 A1 | 6/2006 | See et al. |
| 2006/0146745 A1 | 7/2006 | Cai et al. |
| 2006/0153232 A1 | 7/2006 | Shvodian |
| 2006/0193282 A1 | 8/2006 | Ikawa et al. |
| 2006/0256818 A1 | 11/2006 | Shvodian et al. |
| 2007/0098006 A1 | 5/2007 | Parry et al. |
| 2007/0099619 A1 | 5/2007 | Parekh et al. |
| 2007/0140115 A1 | 6/2007 | Bienas et al. |
| 2007/0147326 A1 | 6/2007 | Chen |
| 2007/0206531 A1 * | 9/2007 | Pajukoski et al. ............. 370/329 |
| 2008/0031253 A1 | 2/2008 | Kim et al. |
| 2008/0095105 A1 | 4/2008 | Sundberg et al. |
| 2008/0232291 A1 | 9/2008 | Hus et al. |
| 2008/0285501 A1 | 11/2008 | Zhang et al. |
| 2009/0129330 A1 | 5/2009 | Kim et al. |

| | | | |
|---|---|---|---|
| 2009/0156194 A1 | 6/2009 | Meylan | |
| 2009/0175241 A1 | 7/2009 | Ohta et al. | |
| 2009/0175253 A1 | 7/2009 | Wu et al. | |
| 2009/0219842 A1 | 9/2009 | Moon et al. | |
| 2009/0323646 A1* | 12/2009 | Ketchum et al. | 370/338 |
| 2010/0014430 A1 | 1/2010 | Oka | |
| 2010/0034095 A1 | 2/2010 | Ho et al. | |
| 2010/0103899 A1 | 4/2010 | Kwak et al. | |
| 2010/0105334 A1 | 4/2010 | Terry et al. | |

FOREIGN PATENT DOCUMENTS

| | | |
|---|---|---|
| CN | 1658545 | 8/2005 |
| CN | 101248699 | 10/2012 |
| EP | 0617875 B1 | 12/1997 |
| EP | 0978958 | 2/2000 |
| EP | 1041850 | 4/2000 |
| EP | 1009184 | 6/2000 |
| EP | 1041850 | 10/2000 |
| EP | 1261222 | 11/2002 |
| EP | 1361514 | 11/2003 |
| EP | 1392074 | 2/2004 |
| EP | 1496639 | 1/2005 |
| EP | 1557968 | 7/2005 |
| EP | 1212853 | 8/2005 |
| EP | 1599063 | 11/2005 |
| EP | 1599063 A1 | 11/2005 |
| EP | 1605724 | 12/2005 |
| EP | 1684538 | 7/2006 |
| JP | 1994-013959 | 1/1994 |
| JP | 09055693 | 2/1997 |
| JP | 1997-327072 | 12/1997 |
| JP | 11-331949 | 11/1999 |
| JP | 1999-308671 | 11/1999 |
| JP | 2000-032088 | 1/2000 |
| JP | 2000-151494 | 5/2000 |
| JP | 2000-175271 | 6/2000 |
| JP | 2000-177621 | 6/2000 |
| JP | 2000-184428 | 6/2000 |
| JP | 2000-215192 | 8/2000 |
| JP | 2001-095031 | 4/2001 |
| JP | 2001-298770 | 10/2001 |
| JP | 2002-135231 | 5/2002 |
| JP | 2003116172 | 4/2003 |
| JP | 2005-517369 | 8/2003 |
| JP | 2003-333661 | 11/2003 |
| JP | 2004-320165 | 11/2004 |
| JP | 2004-349884 | 12/2004 |
| JP | 2005-006660 | 1/2005 |
| JP | 2005-500761 | 1/2005 |
| JP | 2005-237013 | 9/2005 |
| JP | 2005-244958 | 9/2005 |
| JP | 2005-278167 | 10/2005 |
| JP | 2005-536168 | 11/2005 |
| JP | 2006-014372 | 1/2006 |
| JP | 2006-020044 | 1/2006 |
| JP | 2006-505998 | 2/2006 |
| JP | 2009284532 | 3/2009 |
| KR | 10-2001-0111637 | 12/2001 |
| KR | 1020010111634 | 12/2001 |
| KR | 1020010111637 | 12/2001 |
| KR | 1020040048675 | 6/2004 |
| KR | 10-2004-0058638 | 7/2004 |
| KR | 1020040064867 | 7/2004 |
| KR | 1020040089937 | 10/2004 |
| KR | 10-2005-0046305 | 5/2005 |
| KR | 10-2005-0078635 | 8/2005 |
| KR | 10-2005-0078636 | 8/2005 |
| KR | 10-2005-0078640 | 8/2005 |
| RU | 2168278 | 5/2001 |
| RU | 2191479 | 10/2002 |
| RU | 2232469 | 7/2004 |
| RU | 2232477 | 7/2004 |
| RU | 2237380 | 9/2004 |
| RU | 2263415 | 10/2005 |
| RU | 2270526 | 2/2006 |
| RU | 2009106289 | 8/2010 |
| TW | 407407 | 10/2000 |
| TW | 552815 | 9/2003 |
| TW | 586283 | 5/2004 |
| TW | 589818 | 6/2004 |
| TW | 590340 | 6/2004 |
| TW | 592412 | 6/2004 |
| TW | I228008 | 2/2005 |
| TW | I229268 | 3/2005 |
| TW | I229514 | 3/2005 |
| TW | I237478 | 8/2005 |
| TW | I239731 | 9/2005 |
| TW | I239756 | 9/2005 |
| TW | 200536318 | 11/2005 |
| WO | 84/02021 A1 | 5/1984 |
| WO | 99-44383 | 9/1999 |
| WO | 99-63713 | 12/1999 |
| WO | 99/63713 A1 | 12/1999 |
| WO | 01/20924 | 3/2001 |
| WO | 02-03720 | 1/2002 |
| WO | 02/39697 | 5/2002 |
| WO | 02-39760 | 5/2002 |
| WO | 0239760 A2 | 5/2002 |
| WO | 0247417 A1 | 6/2002 |
| WO | 02/075442 | 9/2002 |
| WO | 02-102110 | 12/2002 |
| WO | 03007636 A1 | 1/2003 |
| WO | 03-017691 | 2/2003 |
| WO | 03017691 A2 | 2/2003 |
| WO | 03-043259 | 5/2003 |
| WO | 03043259 A1 | 5/2003 |
| WO | 03056723 A1 | 7/2003 |
| WO | 03-096571 | 11/2003 |
| WO | 2004-034656 | 4/2004 |
| WO | 2004/034656 | 4/2004 |
| WO | 2004034656 A2 | 4/2004 |
| WO | 2004-045234 | 5/2004 |
| WO | 2004-075442 | 9/2004 |
| WO | 2004-089030 | 10/2004 |
| WO | 2004/089030 | 10/2004 |
| WO | 2004/100598 | 11/2004 |
| WO | 2005-055472 | 6/2005 |
| WO | 2005/055472 | 6/2005 |
| WO | 2005074312 A1 | 8/2005 |
| WO | 2005088886 A1 | 9/2005 |
| WO | 2005/099125 | 10/2005 |
| WO | 2005/109837 | 11/2005 |
| WO | 2005/117317 | 12/2005 |
| WO | 2005/119941 | 12/2005 |
| WO | 2005-125125 | 12/2005 |
| WO | 2006/011953 | 2/2006 |
| WO | 2007/078156 | 7/2007 |

OTHER PUBLICATIONS

NTT Docomo et al.: : Multiplexing Method of Shared Control Channel in Uplink Single-Carrier FDMA Radio Access, 3GPP TSG-RAN WG1, R1-051143 [online], Oct. 10, 2005 [retrieved on Jul. 24, 2008]. Retrieved from the Internet: <http://www.3gpp.org/ftp/tsg_ran/wg1_rl1/TSGR1_42bis/Docs/R1-051143.zip> pp. 1-8.

Philips: "Evolved Paging Indicators for LTE", 3GPP TSG-RAN WG2, R2-052985 [online], Nov. 7, 2005 [retrieved on Aug. 25, 2008]. Retrieved from the Internet: <http://www.3gpp.org/FTP/tsg_ran/WG2_RL2/TSGR2_49/Documents/R2-052985.zip> pp. 1, 2.

Sarkar, S. et al. Common-Channel Soft Handoff in cdma2000-The Paging Channel. IEEE Transactions on Microwave Theory and Techniques. Jun. 2000, vol. 48, No. 6, pp. 938 to 950, XP011037998, ISSN 0018-9480. abstract, section IV.

NTT Docomo, et al.: "Paging Channel Structure for E-UTRA Downlink", 3GPP TSG-RAN WG1, R1-060034 [online], Jan. 23, 2006 [retrieved on Aug. 25, 2008]. Retrieved from the Internet: <http://www.3gpp1.org/ftp/tsg_ran/WG1_RL1/TSGR1_AH/LTE_AH_January-06/Docs/R1-060034.zip> pp. 1-5.

Motorola: "Paging Channel Design for E-UTRA", 3GPP TSG-RAN WG1, R1-061712 [online], Jun. 27, 2006 [retrieved on Aug. 25, 2008]. Retrieved from the Internet: <http://www.3gpp1.org/ftp/tsg_ran/WG1_RL1/TSGR1_AH/LTE_AH_June-06/Docs/R1-061712.zip> pp. 1-3.

LG Electronics Inc.: "Framing in the MAC entity", 3GPP TSG-RAN WG2, R2-061012, Mar. 27-31, 2006.

LG Electronics Inc.: "HARQ and ARQ Operation", 3GPP TSG-RAN WG2, R2-060106, Jan. 9-13, 2006.
Ericsson, "E-UTRA Random Access," TSG-RAN WG1 #43, R1-051445, Nov. 7, 2005.
Taiwan Intellectual Property Office Application Serial No. 096104339, Office Action dated Dec. 6, 2012, 6 pages.
LG Electronics Inc., "Framing in the MAC Entity," 3GPP TSG-RAN WG2 #52, R2-061012, Mar. 2006.
F.A. Zdarsky et al., "Handover in Mobile Communication Networks: Who is in Control Anyway?," Proceedings of the 30th EUROMICRO Conference, Aug. 2004, XP-10723593A.
H. Xu et al., "Performance Analysis on the Radio Link Control Protocol of UMTS System," IEEE Publication, Jul. 2001, pp. 2026-2030.
J. Chung et al., "Packet Synchronization and Identification for Incremental Redundancy Transmission in FH-CDMA Systems," Third IEEE International Symposium on Personal, Indoor, and Mobile Radio Communications, Oct. 1992, pp. 292-295, XP-010107082.
R.T. Derryberry et al., "On CDMA 2000 Evolution—Reverse High-Speed Packet Data Physical Layer Enhancements in CDMA 2000 1xEV-DV," IEEE Communications Magazine, Apr. 2005, vol. 43, No. 4, pp. 41-47, XP-001228792.
LG Electronics Inc., "HARQ and ARQ Operation," 3GPP TSG-RAN WG2 #50, R2-060106, Jan. 2006.
Qualcomm, "Need for MAC-hs Segmentation Mechanism," R2-020769, 3GPP TSG RAN WG2 Meeting #28, Apr. 2002.
Motorola et al., "MAC-e/es header and functional split," R2-042360, 3GPP TSG RAN WG2 Meeting#45, Nov. 2004.
LG Electronics Inc., "MAC Enhancement," R2-060561, 3GPP TSG-RAN WG2 #51, Feb. 2006.

3rd Generation Partnership Project (3GPP), "Technical Specification Group Radio Access Network; Evolved Universal Terrestrial Radio Access (E-UTRA) Medium Access Control (MAC) protocol specification (Release 8)," 3GPP TS 36.321 V8.4.0, Dec. 2008.
China Mobile, "RRC States Analysis in LTE," 3GPP TSG RAN WG2#48, R2-052140, Aug. 29, 2005.
Panasonic, "E-UTRA Transport and Logical Channels," 3GPP TSG RAN WG2#49, R2-052860, Nov. 7, 2005.
Siemens, "States in E-UTRAN," 3GPP TSG-RAN WG RAN2#48, R2-052501, Aug. 29, 2005.
Qualcomm Europe, "Signaling Optimization for E-UTRAN," 3GPP TSG-RAN WG2 Meeting #48-bis, R2-052407, Oct. 10, 2005.
Qualcomm, "Max number of MAC-hs header extensions", R2-042023, 3GPP TSG-RAN WG2 meeting #44, Oct. 2004.
IPWireless, "Layer 2 functions for LTE," R2-052377, 3GPP TSG RAN WG2 #48bis, Oct. 2005.
Ericsson, "User plane protocol enhancements," R2-052749, TSG-RAN WG2 Meeting #48bis, Oct. 2005.
LG Electronics Inc., "MAC Architecture of LTE," R2-060105, 3GPP TSG-RAN WG2 #50, Jan. 2006.
LG Electronics Inc., "HARQ and ARQ Operation," R2-060563, 3GPP TSG-RAN WG2 #51, Feb. 2006.
LG Electronics Inc., "Discussion on RLC PDU Structure," R2-070721, 3GPP TSG-RAN WG2 #57, Feb. 2007.
Haardt, M., et al., "The TD-CDMA Based UTRA TDD Mode," IEEE Journal on Selected Areas in Communications, vol. 18, No. 8, pp. 1375-1385, Aug. 2000.

* cited by examiner

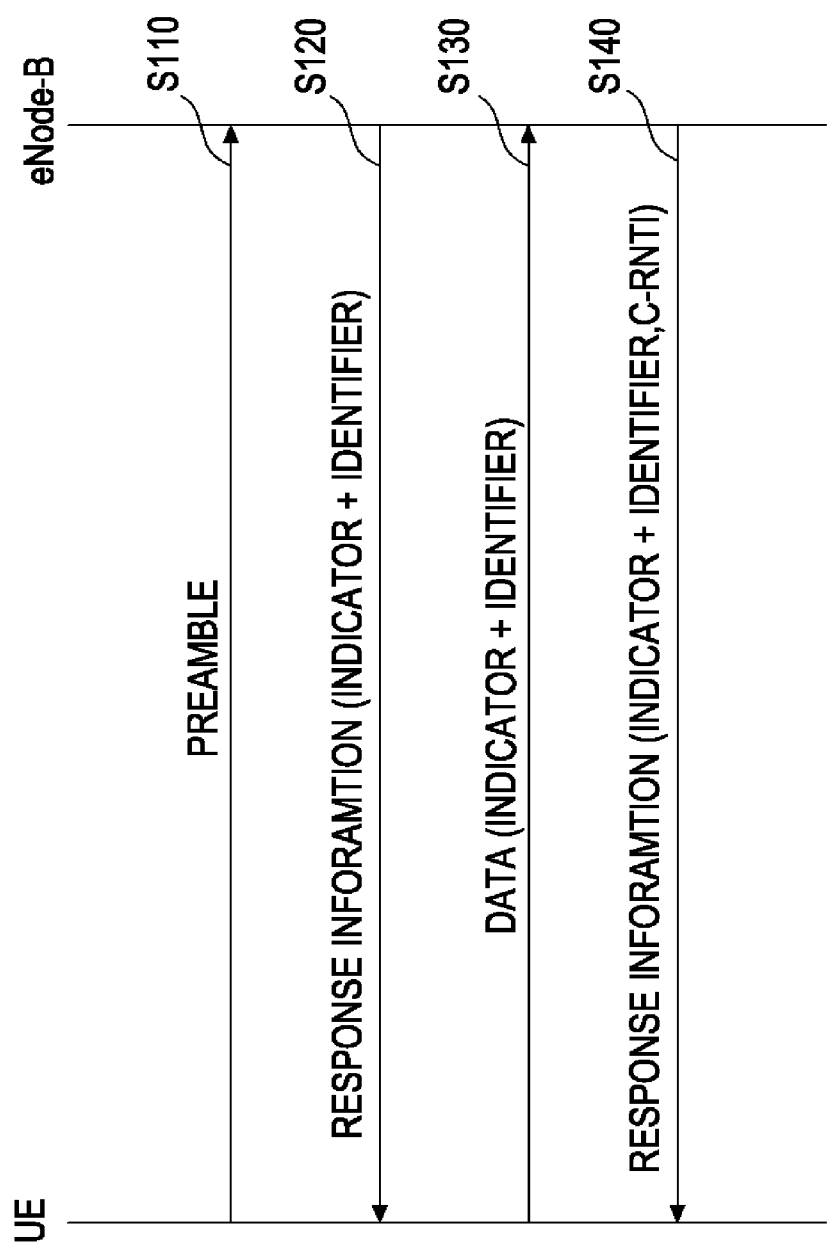

METHOD FOR AVOIDING COLLISION USING IDENTIFIER IN MOBILE NETWORK

CROSS-REFERENCE TO RELATED APPLICATIONS

This application is the National Stage filing under 35 U.S.C. 371 of International Application No. PCT/KR2007/000667, filed on Feb. 7, 2007, which claims the benefit of earlier filing date and right of priority to Korean Application No. 10-2006-0087372, filed on Sep. 11, 2006, and also claims the benefit of U.S. Provisional Application Ser. No. 60/771,305, filed on Feb. 7, 2006.

TECHNICAL FIELD

The present invention is directed to a mobile network and, specifically, to a method for avoiding collision among transmissions in a mobile network.

BACKGROUND ART

A third generation partnership project (3GPP) mobile system based on a wideband code division multiple access (WCDMA) radio access technology has been widely developed all over the world. A high-speed downlink packet access (HSDPA), which is a first step in the evolution of the WCDMA, provides the 3GPP with a radio access technology having high competitiveness. However, since radio access technology has been continuously developed in view of requirements and expectations of users and providers, evolution of a new technology in the 3GPP is required to increase competitiveness.

Accordingly, "Evolved UTRA and UTRAN" has been studied for the purpose of developing a wireless transmission technology that can significantly reduce cost while providing a high-quality service. The 3G long-term evolution (LTE) aims to reduce cost of a user and a provider and improve service quality as well as expanded coverage and system capacity improvement. The 3G LTE requires reduced cost per bit, increased service availability, flexible use of a frequency band, a simple structure and an open interface, and adequate power consumption of a terminal as an upper-level requirement.

Generally, one Node-B is deployed in one cell. A plurality of user equipment (UE) may be located in one cell. The user equipment must perform a random access process for access to a network.

FIG. 1 is a block diagram illustrating a communication network, such as a network structure of an evolved universal mobile telecommunication system (E-UMTS). The E-UMTS may be also referred to as an LTE system. The communication network is widely deployed so as to provide a variety of communication services such as sound and packet data.

As illustrated in FIG. 1, the E-UMTS network includes an evolved UMTS terrestrial radio access network (E-UTRAN) and a core network (CN). The E-UTRAN may include one or more evolved Node-B (eNode-B) 20. The CN may include a node for registering a user of a user equipment (UE) 10 and one or more E-UTRAN access gateway (AG) 30 positioned at the end of the network and connected to an external network.

As used herein, "downlink" refers to communication from an eNode-B 20 to the UE 10 and "uplink" refers to communication from the UE to an eNode-B. The UE 10 refers to communication equipment carried by a user and may be also be referred to as a mobile station (MS), a user terminal (UT), a subscriber station (SS) or a wireless device.

An eNode-B 20 provides end points of a user plane and a control plane to the UE 10. An AG 30 provides an end point of a session and mobility management function for the UE 10. An eNode-B 20 and an AG 30 may be connected via an S1 interface.

An eNode-B 20 is generally a fixed station that communicates with a UE 10 and may also be referred to as a base station (BS) or an access point. One eNode-B 20 may be deployed per cell. An interface for transmitting user traffic or control traffic may be used between eNode-Bs 20.

An AG 30 is also referred to as a mobility management entity/user plane entity (MME/UPE). An AG 30 may be classified into a portion for performing a user traffic process and a portion for performing a control traffic process. New communication may be performed between an AG 30 for performing the user traffic process and an AG for performing the control traffic process using a new interface.

An interface for distinguishing between the E-UTRAN and the CN may be used. A plurality of nodes may be connected between an eNode-B 20 and an AG 30 via the S1 interface. The eNode-Bs 20 may be connected to each other via an X2 interface and neighboring eNode-Bs 20 may always have a meshed network structure that has the X2 interface.

Layers of radio interface protocol between the UE 10 and the network may be classified into a first layer L1, a second layer L2 and a third layer L3 based on three lower-level layers of an open system interconnection (OSI) reference model that is widely known in communication networks. A physical layer belonging to the first layer provides an information transfer service using a physical channel. A radio resource control (RRC) layer belonging to the third layer serves to control radio resources between the UE 10 and the network. The UE and the network exchange an RRC message via the RRC layer.

The RRC layer may be located in a network node of an eNode-B 20 or AG 30. Alternatively, the RRC layer may be located at an eNode-B 20 or AG 30.

The radio interface protocol horizontally includes a physical layer, a data link layer and a network layer and vertically a user plane for transmitting data information and a control plane for transmitting a control signal. FIG. 2 is a block diagram illustrating the control plane of the radio interface protocol. FIG. 3 is a block diagram illustrating the user plane of the radio interface protocol. FIGS. 2 and 3 illustrate the structure of the radio interface protocol between the UE 10 and the E-UTRAN based on a radio access network standard.

As illustrated in FIGS. 2 and 3, the physical layer provides an information transfer service to an upper-level layer using a physical channel. The physical layer is connected to a medium access control (MAC) layer, which is an upper-level layer, via a transport channel.

Data is transferred between the MAC layer and the physical layer via the transport channel. Data is transferred between different physical layers, such as, a physical layer for a transmitter and a physical layer for a receiver, via a physical channel.

The MAC layer, which belongs to the second layer, provides a service to a radio link control (RLC) layer, which is an upper-level layer, via a logical channel. The RLC layer, which belongs to the second layer, supports reliable data transmission. It should be noted that the RLC layer is depicted in dotted lines, because if the RLC functions are implemented in and performed by the MAC layer, the RLC layer itself may not need to exist.

A packet data convergence protocol (PDCP) layer, which belongs to the second layer, performs a header compression function to reduce the size of an Internet Protocol (IP) packet header that includes unnecessary control information and has a relatively large size. In this way, efficient transmission of packets in a radio section having a narrow bandwidth may be facilitated when transmitting an IP packet, such as an IPv4 packet or an IPv6 packet.

The Radio Resource Control (RRC) layer, which belongs to the third layer, is defined in only the control plane. The RRC layer serves to control the logical channel, the transport channel and the physical channels in association with configuration, reconfiguration and release of radio bearers. A radio bearer is a service provided by the second layer for data transmission between the UE 10 and E-UTRAN.

A downlink transport channel for transmitting data from the network to the UE 10 includes a broadcast channel (BCH) for transmitting system information and a downlink shared channel (SCH) and shared control channel (SCCH) for transmitting the user traffic or a control message. The traffic or the control message of a downlink multicast service or broadcast service may be transmitted via the downlink SCH or a additional multicast channel (MCH).

An uplink transport channel for transmitting data from the UE 10 to the network includes a random access channel (RACH) for transmitting an initial control message and an uplink shared channel (SCH) and shared control channel (SCCH) for transmitting the user traffic or the control message. The RACH for transmitting the initial control message from the UE 10 to the network will now be described.

The random access process is performed via a random access channel (RACH) that is an uplink transport channel. The user equipment transmits an initial control message to the network via the RACH. The RACH is used to synchronize the user equipment with the network and to acquire radio resources when the user equipment needs to transmit data but has no uplink radio resources for transmitting the data.

More than one user equipment may try to acquire the same radio resources via the RACH. When this occurs, more than one user equipment may simultaneously transmit messages using the same radio resources. The messages may collide with each other and their transmission may fail.

A user equipment that fails to transmit a message uses the RACH again after a pre-determined time elapses. Data transmission time may significantly increase due to collisions and radio resources may be wasted due to re-access.

DISCLOSURE OF INVENTION

Technical Problem

An object of the invention is to provide a method for avoiding collision among transmissions from user equipment using an identifier in a mobile network.

Technical Solution

In one aspect of the present invention, a method for communicating information in a mobile communication system is provided. The method includes transmitting a preamble over a random access channel (RACH), receiving a response to the preamble, the response including an identifier and an indicator, the identifier generated according to the preamble and the indicator corresponding to the identifier and transmitting data using the identifier and indicator.

It is contemplated that the identifier includes one of a random identifier (random Id), a MAC identifier (MAC Id), a cell-radio network temporary identity (C-RNTI) and a packet-temporary mobile subscriber identity (P-TMSI). It is further contemplated that the data is transmitted in one of an RRC message, user data and uplink control information.

It is contemplated that the method further includes receiving a response to the data including the identifier, the indicator and a C-RNTI. It is further contemplated that the response is one of an RRS message, user data and downlink control information.

In another aspect of the present invention, a method for communicating information in a mobile communication system is provided. The method includes receiving a preamble over a random access channel (RACH), generating an identifier according to the preamble, generating an indicator corresponding the identifier, transmitting a response to the preamble, the response including the identifier and the indicator and receiving data transmitted using the identifier and indicator.

It is contemplated that the identifier is generated according to at least one of a signature and a RACH occasion in the preamble. It is further contemplated that the identifier includes one of a random identifier (random Id), a MAC identifier (MAC Id), a cell-radio network temporary identity (C-RNTI) and a packet-temporary mobile subscriber identity (P-TMSI).

It is contemplated that the method further includes using the identifier and indicator in the received data to determine from which mobile communication terminal the data was received. It is further contemplated that the data is received in one of an RRC message, user data and uplink control information.

It is contemplated that the method further includes transmitting a response to the data including the identifier, the indicator and a C-RNTI. It is further contemplated that the response is transmitted in one of an RRS message, user data and downlink control information.

In another aspect of the present invention, a method for communicating information in a mobile communication system is provided. The method includes a mobile communication terminal transmitting a preamble over a random access channel (RACH), a network generating an identifier according to the preamble and an indicator corresponding the identifier, the network transmitting a response to the preamble, the response including the identifier and the indicator and the mobile communication terminal transmitting data using the identifier and indicator.

It is contemplated that the network generates the identifier according to at least one of a signature and a RACH occasion in the preamble. It is further contemplated that the identifier includes one of a random identifier (random Id), a MAC identifier (MAC Id), a cell-radio network temporary identity (C-RNTI) and a packet-temporary mobile subscriber identity (P-TMSI).

It is contemplated that the method further includes the network using the identifier and indicator in the received data to determine that the data was received form the mobile communication terminal. It is further contemplated that the mobile communication terminal transmits the data in one of an RRC message, user data and uplink control information.

It is contemplated that the method further includes the network transmitting a response to the data including the identifier, the indicator and a C-RNTI. It is further contemplated that network transmits the response in one of an RRS message, user data and downlink control information.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

Advantageous Effects

According to the present invention, it is possible to transmit/receive reliable data while reducing collision among transmissions from UEs by providing a method for efficiently using an identifier of an UE when the UE uses a RACH and a method for using an indicator when using the identifier.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

FIG. 7 is a flowchart illustrating a method for avoiding collision according to an embodiment of the present invention.

BEST MODE FOR CARRYING OUT THE INVENTION

Figure 1:
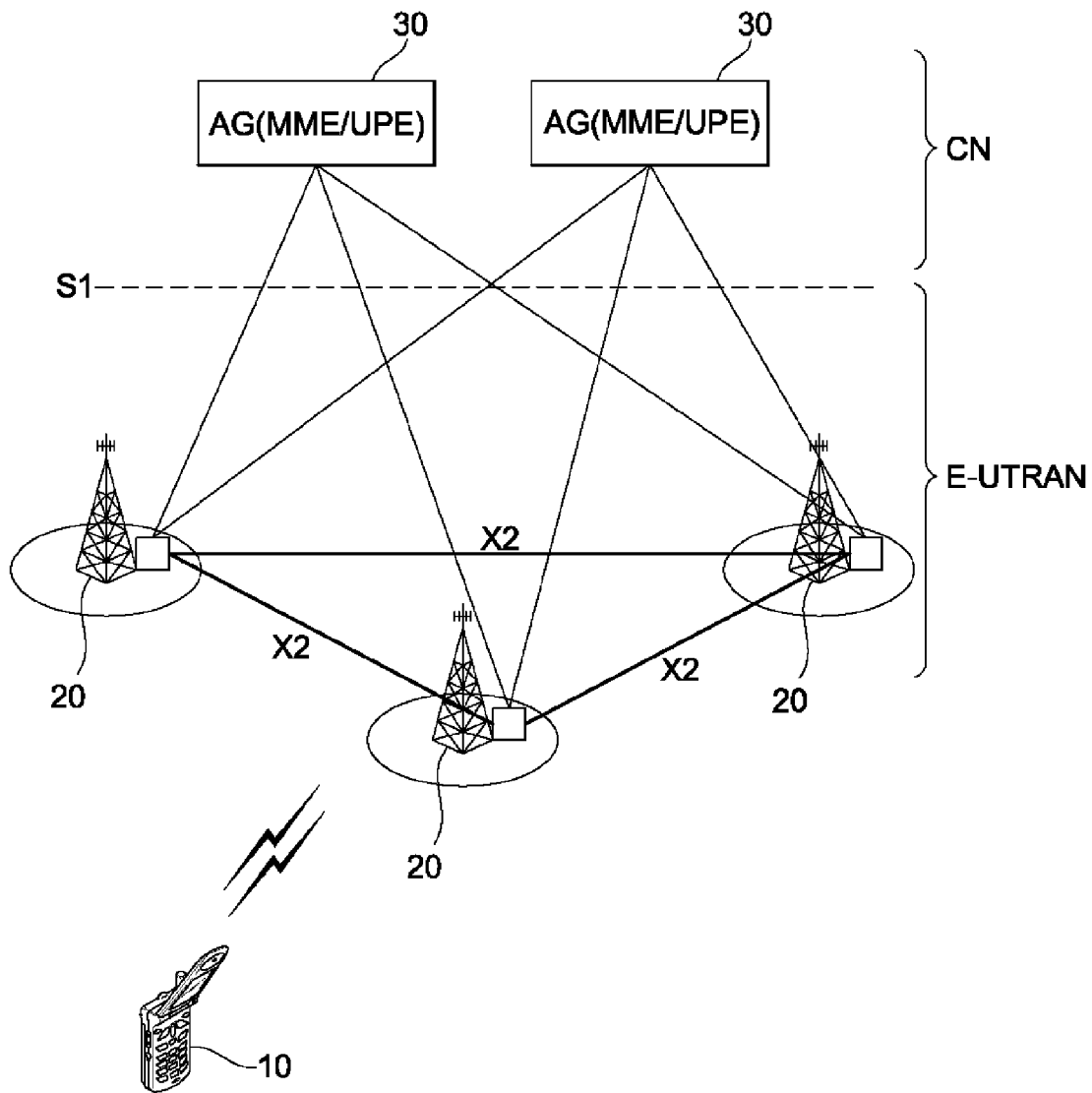
FIG. 1 is a block diagram illustrating a communication network.
Figure 2:
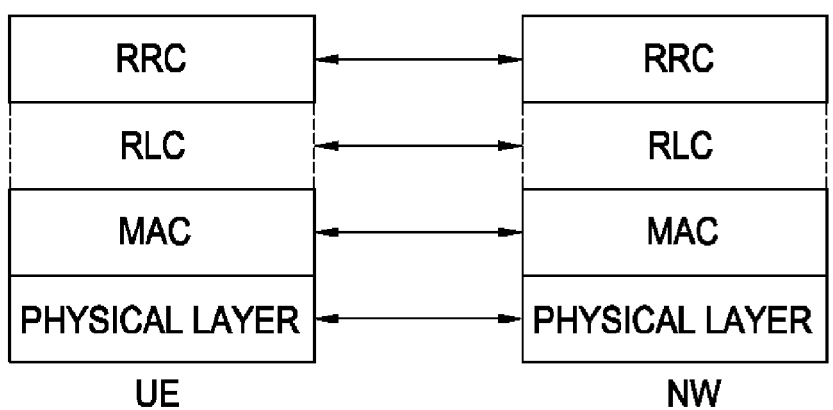
FIG. 2 is a block diagram illustrating a control plane of a radio interface protocol.
Figure 3:
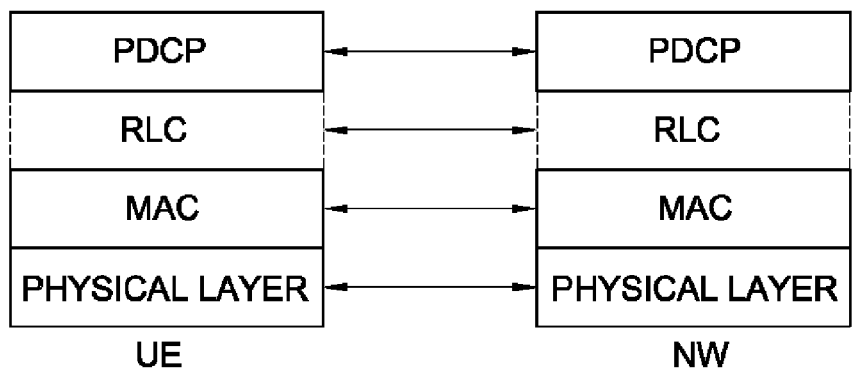
FIG. 3 is a block diagram illustrating a user plane of a radio interface protocol.

Hereinafter, exemplary embodiments of the present invention will be described with reference to the attached drawings. Like reference numerals in the drawings denote like elements throughout the whole specification.

When a UE 10 is turned on, it attempts to access a new cell via the RACH. The UE 10 receives the system information from the cell in synchronization with a downlink channel.

After receiving the system information, the UE 10 must transmit an access request message for RRC connection. However, the RACH is used since the UE 10 is not synchronized with the current network and uplink radio resources are not ensured. The UE 10 requests allocation of radio resources, in order to transmit the access request message to the network using the RACH.

The eNode-B receives the radio resources request and allocates radio resources to the UE 10. The UE then transmits the RRC access message to the network using the allocated radio resources.

When a UE 10 is RRC-connected to the network, it receives the radio resources according to the scheduling of the radio resources from the network and transmits data to the network using the radio resources. The network no longer allocates the uplink radio resources to the UE 10 when no data for transmission is left in a buffer of the UE because it is inefficient that uplink radio resources are allocated to a UE having no data for transmission.

The buffer state of the UE 10 is reported to the network according to periods or occurrence of an incident. When new data is received in the buffer of a UE 10 having no radio resources, the UE uses the RACH because the UE has no allocated uplink radio resources. The UE 10 requests allocation of the radio resources necessary for transmitting the data to the network using the RACH.

The RACH of the WCDMA will be described. The RACH is used to transmit short-length data in the uplink direction.

A portion of an RRC message, such as an RRC connection request message, a cell update message, and an URA update message, is transmitted via the RACH. A logical channel, such as a common control channel (CCCH), a dedicated control channel (DCCH), and a dedicated traffic channel (DTCH) may be mapped to RACH. The RACH may be mapped to a physical channel, such as a physical random access channel (PRACH).

Figure 4:
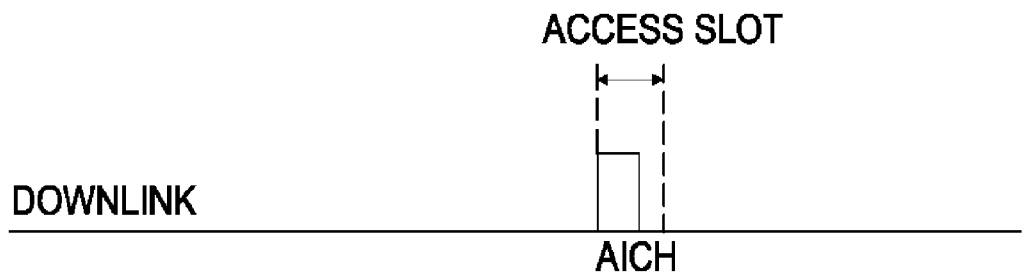
FIG. 4 illustrates an example of a physical random access channel (PRACH).
Figure 4:
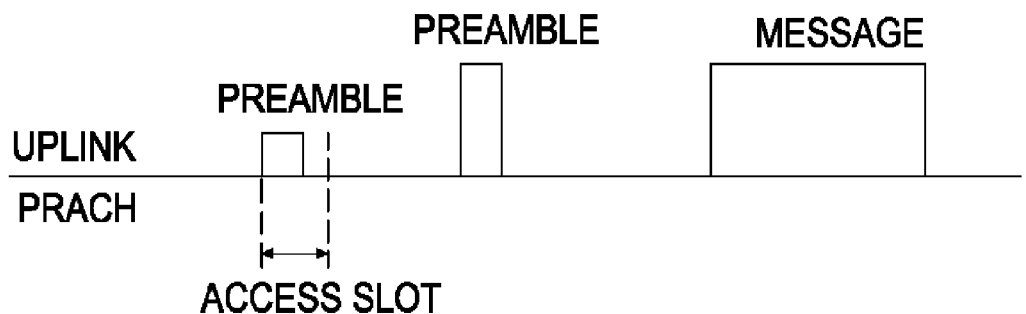

FIG. 4 is a view showing an example of the PRACH. As illustrated in FIG. 4, the PRACH, which is uplink physical channel, may include a preamble portion and a message portion.

The preamble portion performs a power ramping function for adjusting transport power used to transmit a message and a function for avoiding collision among transmissions from several UEs 10. The message portion performs a function for transmitting an MAC protocol data unit (PDU) sent from the MAC layer to the physical channel.

The physical layer selects one access slot and one signature and transmits the preamble portion of the PRACH in the uplink direction when the MAC layer of the UE 10 indicates the physical layer to transmit the PRACH. The preamble portion may be transmitted during the access slot interval having a length of 1.33 ms. One signature may be selected from among 16 signatures during a certain initial interval of the access slot.

The eNode-B may transmit a response signal via a downlink physical channel, such as an acquisition indicator channel (AICH) when the UE 10 transmits the preamble. The eNode-B transmits the response signal, which includes an acknowledgement (ACK) response or a non-acknowledgement (NACK) response, to the UE 10 via the AICH. The UE 10 transmits the message portion when it receives the ACK. The MAC layer of the UE 10 indicates the physical layer of the UE to transmit the PRACH after a predetermined time when it receives the NACK.

The UE 10 transmits a new preamble at power level that is higher than that of the previous preamble by one level after a designated access slot when it does not receive any response signal corresponding to the transmitted preamble.

A data transport signal or a control signal may be transmitted from the eNode-B to the UE 10 in addition to the preamble of the RACH. The control signal transmitted from the eNode-B to the UE includes downlink scheduling information, uplink scheduling grant and response information on the transmission of the preamble portion of the RACH.

An identifier is used to avoid collision among transmissions from the UEs 10 in the uplink or downlink direction. The eNode-B generates the identifier and transmits the identifier to the UE 10 and the UE transmits data using the identifier.

An indicator for identifying the identifiers may also be included when the UE uses the identifier in order to avoid collision between identifiers. The identifier may be used by the eNode-B to distinguish between the UEs 10 when the UE transmits the data or the control signal to the eNode-B. The indicator of the identifier may be used together with the identifier.

The eNode-B may transmit the data or the control signal to a specific UE 10 using the identifier. The indicator of the identifier may be used together with the identifier. The identifier may be required when the data is transmitted from the UE 10 to the eNode-B.

Hereinafter, the identifier and the indicator will be described. The identifier may be a random identifier (random Id), a MAC identifier (MAC Id), a cell-radio network temporary identity (C-RNTI) or a packet-temporary mobile subscriber identity (P-TMSI).

The random Id and the MAC Id may be used when using the RACH. The random Id or the MAC Id may have the same length as that of the C-RNTI.

For example, the random Id, the MAC ID and the C-RNTI may all have a length of 10 bits. Alternatively, only the MAC Id and the C-RNTI may have the same length.

The UE 10 and the eNode-B may generate the same random Id in accordance with a transmission occasion and the signature of the preamble part selected by the UE. For example, the UE 10 and the eNode-B may acquire the same random Id from information on the signature and the transmission occasion when the UE transmits the signature of the preamble part to the eNode-B via the transmission occasion once. The eNode-B informs the UE 10 of information for acquiring the random Id, such as information on the signature and the transmission occasion, via system information or a paging message.

The MAC Id may be an identifier used to identify the UE 10 in a specific cell before the eNode-B allocates the C-RNTI to the UE. The MAC Id may be acquired from the random Id.

The random Id and the MAC Id may be identical when the random Id has the same length as that of the C-RNTI. A Random Id may extend the MAC Id when the length of the random Id is less than that of the C-RNTI. The eNode-B informs the UE 10 how to acquire the MAC Id from the random Id via the system information or the paging message.

The C-RNTI is the identifier for identifying the UE 10 in one cell and is allocated and/or de-allocated by the eNode-B. The UE 10 may receive a new C-RNTI from the eNode-B when the UE enters a new cell. The MAC Id has the same length as that of the C-RNTI. The P-TMSI is an identifier for identifying the UE 10 in one CN and is allocated and/or de-allocated by the AG 30.

The indicator of the identifier distinguishes between the identifiers. The indicator distinguishes between the identifiers used in the RACH, such as the random Id, the MAC Id and the C-RNTI. The indicator is used to prevent the identifiers from colliding with each other when the length of the random Id or the MAC Id is identical to that of the C-RNTI.

For example, if the length of the MAC Id is identical to that of the C-RNTI and UE A has a C-RNTI having 8 bits in the current cell with a value of 1111 0000, UE B uses the RACH to access the cell. Additionally, if the MAC Id is acquired from the random Id and the MAC Id also has a length of 8 bits and the value of 1111 0000, the eNode-B tries to transmit the response information for the preamble part to UE B using the identifier.

However, UE A may erroneously receive the information transmitted to UE B since UE A also receives the information from the eNode-B using its identifier. Furthermore, since UE B uses the MAC Id before receiving the C-RNTI from the eNode-B, the eNode-B may not be able to determine whether the information is transmitted from UE A or UE B when UE B transmits specific information to the eNode-B using its identifier.

The indicator is used to distinguish between the random Id or MAC Id that identifies the UE 10 in the RACH and the C-RNTI or P-TMSI used for communication between the eNode-B and the CN in the cell. For example, a value of "0" may indicate the random Id or the MAC Id and a value of "1" may indicate the C-RNTI or the P-TMSI when the indicator has one bit.

Figure 5:
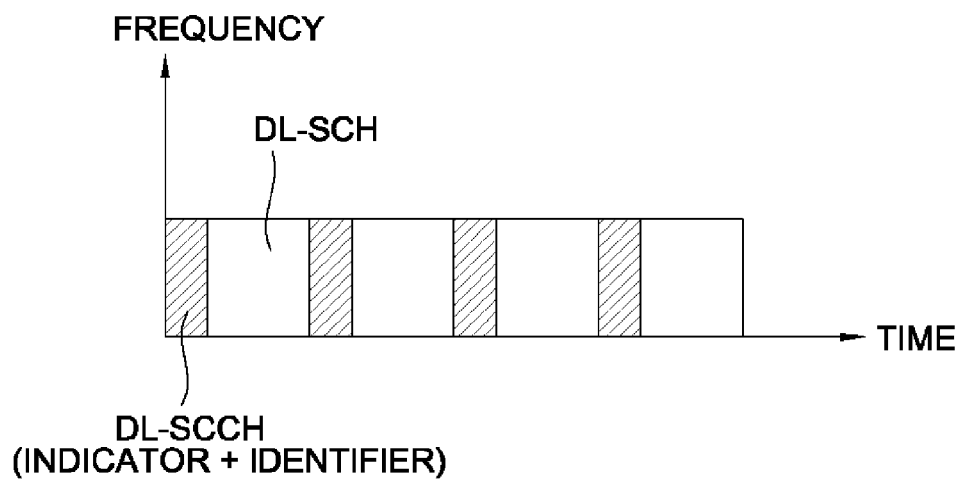
FIG. 5 illustrates downlink scheduling information.

Hereinafter, the transmitted identifier and indicator will be described. FIG. 5 illustrates downlink scheduling information. As illustrated in FIG. 5, the identifier and the indicator of the identifier are included in the downlink scheduling information of a control signal transmitted from the eNode-B to the UE 10.

As illustrated in FIG. 5, the eNode-B, the identifier and the indicator are transmitted to the UE 10 via a DL-SCCH. The UE 10 may transmit data or a control signal to the eNode-B using the indicator and the identifier when transmitting a next message.

Figure 6:
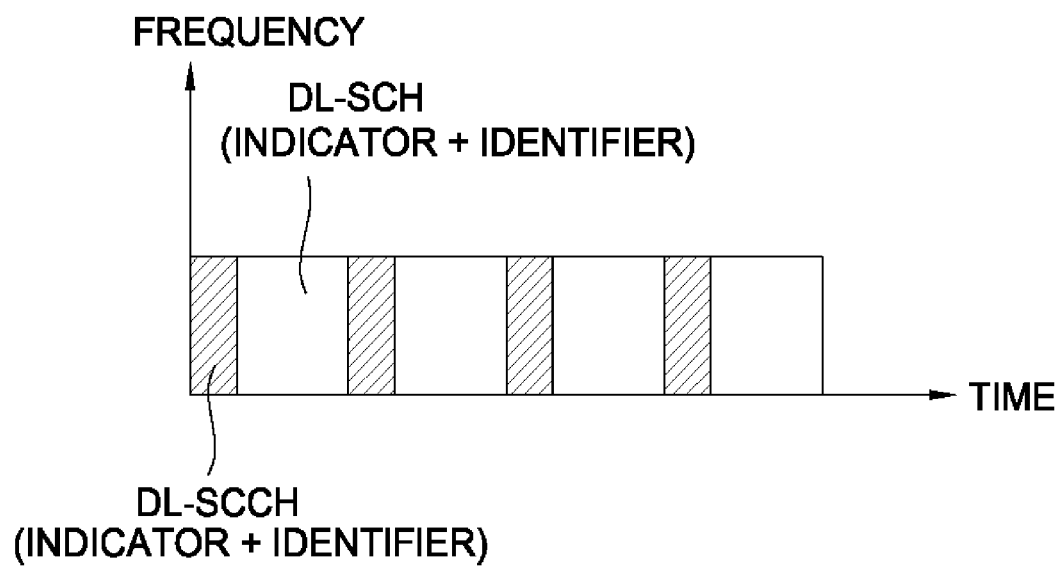
FIG. 6 illustrates an uplink scheduling grant.

FIG. 6 illustrates an uplink scheduling grant. As illustrated in FIG. 6, the identifier and the indicator of the identifier are included in the uplink scheduling grant information of a control signal transmitted from the eNode-B to the UE 10.

As illustrated in FIG. 6, the eNode-B transmits the uplink scheduling grant information to the UE 10 via a DL-SCCH or a DL-SCH. The uplink scheduling grant information having different information may be transmitted through the DL-SCCH and the DL-SCH, respectively.

The identifier and the indicator of the identifier are transmitted to the UE 10 via the DL-SCCH or the DL-SCH. The UE 10 may transmit data or a control signal to the eNode-B using the identifier and the indicator transmitting a next message.

FIG. 7 is a flowchart illustrating a method for avoiding collision according to an embodiment of the present invention. FIG. 7 illustrates the identifier and the indicator of the identifier used when the UE 10 uses the RACH.

As illustrated in FIG. 7, the UE 10 transmits the preamble portion to the eNode-B using the selected signature and the transmission occasion (S110). The eNode-B transmits response information for the preamble portion to the UE (S120).

The response information may include an identifier, such as a MAC Id. The response information may further include an indicator for identifying the identifier.

The eNode-B acquires a random Id using the preamble portion and generates the MAC Id. The eNode-B and the UE 10 have the same MAC Id. The eNode-B informs the UE 10 of generating method of the MAC Id by the system information or the paging information.

The UE 10 receives the response information for the preamble portion and transmits data using radio resource allocation information included in the response information and the identifier, such as the MAC Id, and the indicator (S130). The data may include the identifier, such as the MAC Id, and the indicator for identifying the identifier. The transmitted data may be an RRC message, user data or uplink control information.

The eNode-B transmits response information for the data received from the UE 10 (S140). The response information may include the identifier, such as the MAC Id, the indicator for identifying the identifier, and a C-RNTI used by the UE 10 in the cell. The response information may be an RRC message, user data or downlink control information.

The steps of a method described in connection with the embodiments disclosed herein may be implemented by hardware, software or a combination thereof. The hardware may be implemented by an application specific integrated circuit (ASIC) that is designed to perform the above function, a digital signal processing (DSP), a programmable logic device (PLD), a field programmable gate array (FPGA), a processor, a controller, a microprocessor, the other electronic unit, or a combination thereof. A module for performing the above function may implement the software. The software may be stored in a memory unit and executed by a processor. The memory unit or the processor may employ a variety of means that is well known to those skilled in the art.

As described above, according to the present invention, it is possible to transmit/receive reliable data while reducing collision among transmissions from UEs by providing a method for efficiently using an identifier of an UE when the UE uses a RACH and a method for using an indicator when using the identifier.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims.

Many alternatives, modifications, and variations will be apparent to those skilled in the art. In the claims, means-plus-function clauses are intended to cover the structure described herein as performing the recited function and not only structural equivalents but also equivalent structures.

Industrial Applicability

The present invention relates to wireless telecommunication network.

The invention claimed is:

1. A method for communicating information in a mobile communication system, the method comprising:
    transmitting, from a user equipment (UE) to a base station (BS), a preamble over a random access channel (RACH), the preamble randomly selected from a plurality of preamble candidates;
    receiving, at the UE, a first response message from the BS in response to the preamble, the first response message including a Medium Access Control (MAC) identifier (MAC Id) and an indicator, the indicator indicating that the MAC Id is included;
    transmitting, from the UE to the BS, data including the MAC Id and the indicator; and
    receiving, at the UE, a second response message from the BS in response to the data, the second response message including a UE identifier and the indicator, the indicator indicating that the UE identifier is included,
    wherein the MAC Id is based on the preamble and is for identifying the preamble transmitted by the UE,
    wherein the UE identifier is for identifying the UE in a cell, and
    wherein a bit length of the MAC Id is equal to a bit length of the UE identifier.

2. The method of claim 1, wherein the data is a radio resource control (RRC) message, user data, or uplink control information.

3. The method of claim 1, wherein the second response message is a radio resource control (RRC) message, user data, or downlink control information.

4. A method for communicating information in a mobile communication system, the method comprising:
    receiving, at a base station (BS), a preamble from a user equipment (UE) over a random access channel (RACH);
    transmitting, from the BS to the UE, a first response message in response to the preamble, the first response message including a Medium Access Control (MAC) identifier (MAC Id) and an indicator, the indicator indicating that the MAC Id is included;
    receiving, at the BS, data transmitted from the UE, the data including the MAC Id and the indicator; and
    transmitting, from the BS to the UE, a second response message in response to the received data, the second response message including a UE identifier and the indicator, the indicator indicating that the UE identifier is included,
    wherein the MAC Id is obtained based on the preamble and is for identifying the preamble,
    wherein the UE identifier is assigned by the BS and is for identifying the UE in a cell served by the BS, and
    wherein a bit length of the MAC Id is equal to a bit length of the UE identifier.

5. The method of claim 4, wherein the data is a radio resource control (RRC) message, user data, or uplink control information.

6. The method of claim 4, wherein the second response message is a radio resource control (RRC) message, user data, or downlink control information.

7. The method of claim 1, wherein the bit length of the MAC Id is 10 bits.

8. A user equipment (UE) for communicating information in a mobile communication system, the UE comprising a processor configured to:
    transmit, to a base station (BS), a preamble over a random access channel (RACH), the preamble randomly selected from a plurality of preamble candidates;
    receive a first response message from the BS in response to the preamble, the first response message including a Medium Access Control (MAC) identifier (MAC Id) and an indicator, the indicator indicating that the MAC Id is included;
    transmit, to the BS, data including the MAC Id and the indicator; and
    receive a second response message from the BS in response to the data, the second response message including a UE identifier and the indicator, the indicator indicating that the UE identifier is included,
    wherein the MAC Id is based on the preamble and is for identifying the preamble transmitted by the UE,
    wherein the UE identifier is for identifying the UE in a cell, and
    wherein a bit size of the MAC Id is equal to a bit size of the UE identifier.

* * * * *